Aug. 1, 1944.　　G. K. BLUM ET AL　　2,354,983
YIELDING PRESSURE WELDING
Original Filed Feb. 11, 1938

Inventors
Gustave K. Blum
Arthur E. Peters
By Henry H. Snelling
Attorney

Patented Aug. 1, 1944

2,354,983

UNITED STATES PATENT OFFICE 2,354,983

YIELDING PRESSURE WELDING

Gustave K. Blum and Arthur E. Peters, York, Pa., assignors to The McKay Company, Pittsburgh, Pa., a corporation of Pennsylvania Original application February 11, 1938, Serial No. 190,082, now Patent No. 2,301,173, dated November 10, 1942. Divided and this application January 10, 1942, Serial No. 426,356

4 Claims. (Cl. 219—10)

This invention relates to yielding pressure welding and has for its object the provision of a method for making better welds with less current than is possible with ordinary welding.

A second object of the invention is to provide a method of welding links of chains, especially chain of high carbon or alloy steels, on a standard automatic chain welding machine with only slight alteration of the machine itself and providing more uniform and better welds while increasing very materially the life of certain parts of the standard machine, particularly the electrodes and the trimmer mechanism.

A third object of the invention is to weld a chain automatically on a but slightly altered chain welding machine, the links of the finished chain being much more nearly uniform in length than is possible with an ordinary chain welding machine whether manually operated or automatic.

A further object of the invention is to provide means in a chain welding machine for cutting off the welding current in response not only to the yielding of the abutting ends but also to the bending of the back of the link.

Another object of the invention is to provide a fully automatic chain welding machine which stops the welding current in response to a desired condition including the temperature of the joint being welded and relatively independent of other factors such as time, current or voltage.

An important object of the invention is to provide a method of welding together opposed surfaces by a combination of a butt welding operation, a flash welding operation and a resistance welding operation, this combination when applied to a standard chain making machine for instance providing a remarkably uniform finished chain because the method causes the machine to work with varying time cycles, each weld being given exactly the proper timing irrespective of whether the link is long or short.

In the ordinary manufacture of chains the welds are made by automatic machinery in case of the smaller chains of low carbon content but it is usual to weld the better grades of chain, particularly those of high carbon or alloy steels such as those containing nickel and molybdenum, by manually operated machines wherein the workmen by long practice are able to press the clutch lever to open the welding circuit at precisely the right time, within the usual limits of human accuracy. Even with the very best of workmen however there is a sharp limit to the temperature that may be employed without "burning" the joints and yet it has been apparent to us for some time that if we could increase materially the temperature of the welding we would have a much better joint provided we could prevent the burning of the links which we believed we could avoid by the use of a more properly timed and higher upset than is provided by the standard chain welding machines now in use. We also felt that the standard machine could be speeded up by the use of higher transformer capacity which would give a quicker heat and it seemed to us this would lend itself nicely to the total elimination of the double stop which is common in practically all chain welding machines in actual use whether of manual or automatic type.

In the past there has been little trouble with the quality of the chain made with low carbon stock and we have frequently tested such chain links by bending them through an angle of 180° with the weld as an axis. With the better grades of chain now coming more and more into use many seemingly excellent welds will not stand a bending in this manner, even as little as 45° and the characteristic weld cracks are almost invariably present in the better quality steels made prior to this invention but these cracks are strikingly absent when chain is made in the manner hereinafter set forth.

In the chain welding machines well known in the art the blocks carrying the electrodes are loosely mounted in their sockets and the vertical posts rising from the blocks are rigidly held a chosen distance apart by a sturdy brace or strap pivotally secured to the top of each post so as to prevent the posts from spreading apart as they would otherwise do by reason of the necessary looseness of fit of the blocks in their pivot sockets, this looseness being necessary because of the expansion of the blocks due to the great heat which is unavoidably created in the blocks by the induced currents. A characteristic of the apparatus, which is but one form of carrying out our process, is that the brace or strap is replaced by spring means thereby the posts are yieldingly urged toward each other at their tops and in the preferred embodiment it is the movement of the post tops, as the metal of the chain yields, that causes the cutting off of the current at precisely the right time.

Among the more striking advantages of the present invention are:

(a) The better quality of each individual weld;

(b) The remarkable increase in uniformity in the gage length of the finished chain due to the fact that the welded links are all of the same length although the formed links were not;

(c) The many-fold increase in the life of the electrodes;

(d) The decrease in amperage as the weld is being made;

(e) The increase of automatic efficiency which makes it easy for a single operator to care for a number of machines and at the same time increasing the over-all life of the machine while increasing the production in pounds per hour, the latter increase running to rather surprising figures in view of the rather well-worked state of the art.

Other advantages are of relatively less importance and will be apparent as the description proceeds, for example, the fin or burr which is made in our process of welding is appreciably less hard than with the standard welding machines with the result that the trimmer lasts longer than in the usual method of chain welding.

Figure 1:
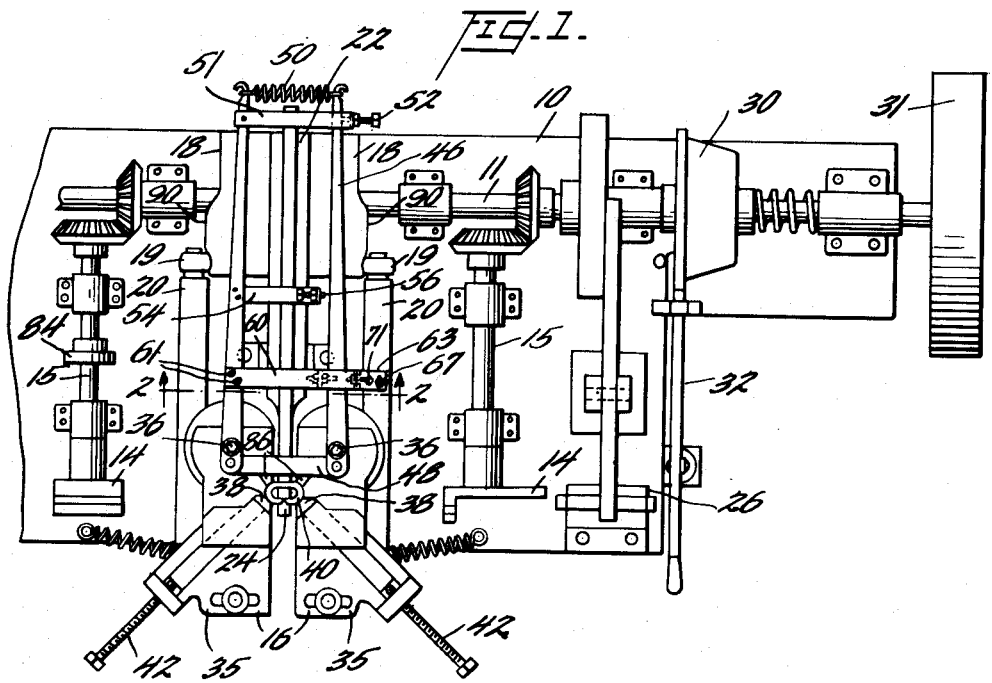
Figure 1 is a plan view of an automatic chain welding machine equipped with one embodiment of our invention.

The chain welding machine shown in Figure 1 is generally of well known type comprising a table 10 on which is mounted at the rear the main shaft 11 which drives the chain advancing devices 14 by way of shafts 15, and oscillates the welding blocks 16 toward and away from each other by means of the face cams 18 acting on the cam followers 19 carried by the ends of the arms 20 rigidly secured to the welding blocks. Upper and lower swaging hammers are arranged to be driven by a cam 22 located between the two face cams but to simplify the drawing the upper hammer is broken away to show more clearly the lower hammer 24. At the front right end of the table there is shown the usual trimmer 26 for removing the burr or fin from the links as they come from the welding mechanism. A clutch 30 connects the main shaft 11 with the drive pulley 31 by operation of the handle 32 in well known manner.

The blocks 35 are loosely pivoted in sockets in the table 10 so as to turn about vertical axes passing through the posts 36 rising from the top of the blocks. The blocks carry the usual heavy copper electrodes 38 which may be adjusted toward or away from the link 40 by means of the adjusting screws 42.

The machine as briefly described is of well known standard make except that in the standard machine the posts 36 are tied together at the top by means of a rigid bar or strap which while allowing rotation prevents the tops of the posts 36 from moving away from each other as the blocks force the electrodes against the link in the welding action. In carrying out our invention we substitute for the rigid bar just mentioned a yoke consisting of two horizontal arms 44 and 46 pivoted at the front ends to a tie bar 48 and having journals just back of this bar for receiving the posts 36. The rear ends of the arms are resiliently connected by a rather stiff spring 50. This yoke mechanism constitutes means for permitting the posts 36 to move toward and away from each other a limited amount during the welding operation.

A member 51 fixed to the arm 44 and projecting over the arm 46 carries an adjustable stop 52 for preventing the arms from spreading apart too far at the final-upset of the joint. A second member 54 also fixed to the arm 44 carries a second adjustable stop 56 limiting the closing movement of the arms.

These stops 52 and 56 are adjusted in accordance with the size and quality of the links of the chain being operated on and the adjustment may be changed merely by moving the screws 52 and 56.

Figure 2:
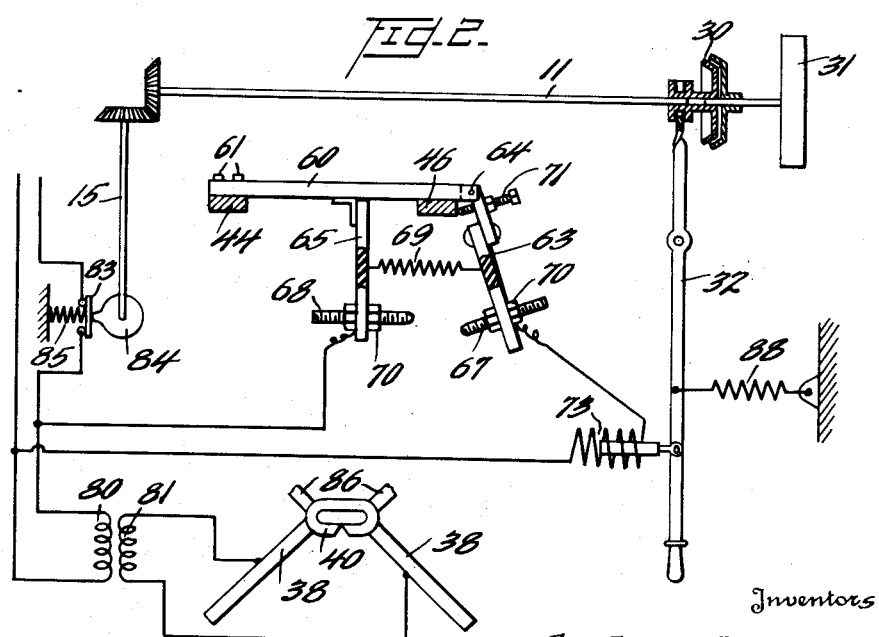
Figure 2 is a sectional view taken on line 2—2 of Figure 1 and to which a diagram is added to show the electrical circuits.

The control switch mechanism is mounted on still a third member 60 which is also rigidly secured to the arm 44 as by means of cap screws 61 and which extends over the arm 46. A switch arm 63 depends from the end of the arm 60 with which it has a hinge-like connection 64 so that it can swing toward and away from a second switch arm 65 (Fig. 2) projecting downward from the member 60 on the opposite side of the arm 46. Adjustable contacts 67 and 68, respectively, carried by the switch arms, are urged into contact by a spring 69 but are normally separated when the yoke arms 44 and 46 move apart sufficiently to bring arm 46 into engagement with the set screw 71 carried by the arm 63. Expressed in other words, when the arms 44 and 46 are spread apart as at the beginning of a welding operation the switch contacts are likewise held apart due to the set screw 71 engaging the arm 46 but as the welding proceeds the arms 44 and 46 gradually move toward each other and permit contacts 67 and 68 to come into quick engagement, thereby closing the control circuit through the clutch operating solenoid 73 as best shown in Figure 2. A part or all of the switch arms 63 and 65 are made of fibre composition or other insulating material.

Due to the fact that the yoke arms 44 and 46 are many times longer than the distance between a pivot 36 and the tie bar 48 and also due to the fact that the set screw 71 is positioned so close to the hinge 64, the slight relative motion of the posts 36 will be greatly multiplied so that extremely accurate adjustment may be made to open or close the control circuit at a precisely predetermined condition of the link ends. The movement of the posts 36 toward each other is so greatly multiplied that an operator, by observing the movement of the arms 44 and 46 is able to operate the clutch lever 32, if he likes, with the control circuit entirely disconnected thereby to open the work circuit at almost exactly the proper time and without in any way watching the weld. It will be seen therefore that the yoke mechanism just described permits an accurate control of the weld in accordance with the condition of the entire link rather than the temperature, color, or appearance of the weld itself which indicia have been used in the past for guiding the operator in controlling the machine.

Referring to Figure 2, an understanding of the sequence of operations will easily be obtained. The primary and secondary of the transformer are conventionally indicated at 80 and 81 respectively, the second being connected to the electrodes 38 which serve to complete the circuit through the link 40. The main switch 83 is closed by the cam 84 on the shaft 15 and opened by the spring 85 upon the rotation of the cam 84; the shaft 15 being rotated when the clutch 30 is engaged by operation of the control handle 32 due to the energization of the solenoid 73 which, as already stated, occurs when the contacts 67 and 68 first engage. The cam 84 is so related to the switch 83 that as soon as the clutch 31 is engaged and the shaft 11 turns a few degrees the line circuit is opened.

The operation of the machine will now be explained. The electrodes 38 are first adjusted to engage the link 40 with less pressure than used in the standard machine, however with sufficient pressure to prevent burning where they make contact with the link. It will be assumed that the chain has been advanced by rotation of the shaft 11 to place an unwelded link 40 in position between the electrodes 38 and the seats 86 and that such rotation of the main shaft 11 has turned the face cams 18 to spread the free ends of the arms 20 which action turns the blocks 35 about the pivots 36 and clamps the electrodes and seats 86 against the link with sufficient force to press the ends of the link against each other. This rotation of the shaft 11 also brings the cam 84 into a position in which the main switch 83 is closed at approximately the same time as the link ends are pressed together so that at this moment the work current begins to flow through the link. When the link is cold it of course exerts the greatest resistance against the rotation of the blocks 35 toward each other and therefore at this time they exert the greatest force tending to separate the pivot posts 36 so that at the moment the current begins to flow the ends of arms 44 and 46 are farthest apart in which position the contacts 67 and 68 are also most distantly separated. The distance apart of contacts 67 and 68 when regulated for the size of the link and the quality of the material of the link is fixed by the lock nuts 70. The moment the welding current begins to flow there is first a glow at the contact point between the link ends, the inside point then reddens and this spot grows around and toward the front of the link and then arcs appear which also increase until there is a momentary flashing all around the joint. The flashing is believed to be due to the use of a higher current in combination with the increase of resistance as the contacting ends fuse. The increase of resistance is partly due to the flowing away of the hot metal to create what is in effect an air gap by an almost complete pressure drop and is partly due to the increase in temperature of the metal. Immediately following this flashing the electrical resistance of the joint evidently reaches a maximum for the current flow through the back of the link increases sufficiently to heat the back of the link visibly, at which time the bend resistance in the link drops below the pressure on the link exerted by the spring 50 which bends the link and causes the now molten ends to merge into each other. The arms 44 and 46 move toward each other due to the heating and resultant bending of the link which motion brings the contacts 67 and 68 sharply together, thereby energizing the solenoid 73, and thus operating the clutch 30 causing the rotation of the shaft 11 which substantially simultaneously opens the main circuit 83, and drops the swaging-hammers on the weld.

Still a third action occurs which is the final upset just prior to the swaging blow which upset is caused by the further spreading of the arms 20 due to the action of the swells 90 on the face cams 18. As previously pointed out we not only use a higher temperature than was possible on the standard machine but we also eliminate entirely the second dwell during the increased upset. The usual increase from initial to final upset is about an eighth of an inch on the face cam but we increase the final upset while keeping the size of the initial upset during the swell as in prior practice, the increase of upset from initial to final (without dwell) being roughly a third of an inch on the face cam 20, readily obtained by securing to the cam a flat strip bevelled at its two ends. The clutch 30 is as usual automatic so that immediately after the closing of the main shaft cycle ending with the closing of the switch 83 the clutch automatically opens thus permitting the followers 19 to rest against the now stationary initial upset swells 90 of the face cams. It will of course be understood that the trimmer 26 operates in its usual manner to remove the burrs which in the process just described are very much softer than in ordinary chain and therefore more easily cut than would be expected in high carbon and alloy steels for which this method was developed as has just been described.

It will be understood that since the control circuit is dependent for current on the closing of the switch 83 that shortly after the contacts 67 and 68 engage, the control circuit is de-energized and that the operating handle 32 is immediately restored to inoperative position by the usual spring 88 whereby the automatic declutching mechanism is permitted to operate to stop the main shaft 11 at the proper point.

It is well understood in the chain making art that as the links come from the forming machine, although apparently quite uniform, the individual links are in fact sufficiently different in length to require an appreciably different amount of current and a different amount of time to form the proper weld and it is for this reason that the automatic control should be responsive to the condition of the weld and link as a whole rather than to any predetermined time of current flow or other observable factor such as color or yield of the weld per se. The condition of the link and weld is a resultant of all these factors. In the process we have just described for any given size of link as delivered by the forming machine, the links are all welded uniformly and are made much more uniform in length than was possible by any prior known method.

In the manually controlled machine not equipped with our improved yoke the operator depended on the time of current flow and/or the color and condition of the weld to guide him in operating the clutch 32. Under such conditions the back of a "long" link would be relatively cold at the time the weld gave every indication of being complete so that the operator would cut off the welding current and leave the link under a strain which upon cooling would cause cracks at the weld which cracks open up when the link is bent 45° to 180° about an axis through the weld. On the other hand a "short" link would get too hot at the weld with the same result that cracks would form. It is also obvious that different operators would have different times of reaction so that the welding current would be cut off at appreciably different points in the welding process with the result that the chains made by one operator would be quite different in quality and uniformity from those made by another operator. However, the non-uniformity of the finished link was not due entirely to the operator but the cause lay in the prior machines which were set to operate for a certain size link and had no provision, such as our yoke, for operating uniformly on links which varied in length over an appreciable range for any given size delivered by the forming machine. In the process we have described the chains are of uniform quality and the links are of uniform length regardless of whether made by the same or different operators. In other words by our new process we have reduced to a minimum those factors which tend to produce poor or non-uniform chains.

This case is a division of our application Serial No. 190,082, filed February 11, 1938 (now Patent No. 2,301,173 dated November 10, 1942).

What we claim is:

1. The method of welding abutting pieces of metal comprising pressing the pieces together with a predetermined pressure including a yielding follow-up pressure, resisting said pressure with a force, passing welding current through the abutting pieces until the contacting surfaces reach a yielding condition and said resisting force receives the greater portion of said predetermined pressure, reducing said resisting force in proportion to the yielding condition of the abutting pieces under action of said follow-up pressure and finally at a chosen point of yield stopping the flow of welding current and substantially simultaneously upsetting said joint and delivering a swaging blow to said weld.

2. The method of welding a chain comprising applying a pressure to a link sufficient to press the open ends together but insufficient to bend the back of the link, passing an electric current through the link at the joint until the contacting ends are molten, then continuing the current until the back of the link is raised to a temperature at which said pressure bends the link and forces the molten ends into each other then cutting off the current and applying a swaging blow to the joint.

3. The method of welding a link comprising forcing the open ends together with a force insufficient to bend the back of the link when cold, fusing the connecting ends and at the same time heating the back of the link until said pressure bends said back of the link and forces the fusing ends closer together and finally applying an upset pressure to the link and simultaneously applying a swaging blow to the joint.

4. The method of welding two bar ends of a given cross section which comprises holding said ends together in abutting relation with a force including a yielding follow-up pressure, passing current through the abutting ends, resisting the follow-up movement permitted by the yielding of the ends as they fuse, reducing the resistance to the follow-up pressure in proportion to the travel of heat backward from the joint.

GUSTAVE K. BLUM.
ARTHUR E. PETERS.